United States Patent [19]
Lewis

[11] Patent Number: 5,404,702
[45] Date of Patent: Apr. 11, 1995

[54] RETROFITABLE WIDE WINDROW APPARATUS

[76] Inventor: Johnny M. Lewis, Rte. 1, Box 217, Eustace, Tex. 75124

[21] Appl. No.: 238,676

[22] Filed: May 5, 1994

[51] Int. Cl.$^6$ .............................................. A01D 39/00
[52] U.S. Cl. ...................................... 56/365; 56/341; 56/364
[58] Field of Search ................. 56/341, 344, 345, 364, 56/365

[56] References Cited

U.S. PATENT DOCUMENTS

| | | | |
|---|---|---|---|
| 2,731,782 | 1/1956 | Mason | 56/341 |
| 4,077,189 | 3/1978 | Hering | 56/11.9 |
| 4,214,428 | 7/1980 | Caraway | 56/341 |
| 4,651,512 | 3/1987 | van der Lely | 56/364 X |
| 4,905,466 | 3/1990 | Heppner | 56/364 |
| 4,951,452 | 8/1990 | Lundahl et al. | 56/341 |
| 5,127,217 | 7/1992 | Fell et al. | 56/341 |

*Primary Examiner*—Michael Powell Buiz
*Attorney, Agent, or Firm*—C. W. Alworth; R. B. Sefrna

[57] ABSTRACT

A wide windrow raking apparatus which may be retroactively fitted to a hay baler as an after market product or which may be fitted to a hay baler by the manufacturer is disclosed. The apparatus employs an extension frame between the hay baler and its towing tractor to which commercially available wide windrow power rakes may be attached. The apparatus includes activation and control assemblies, powered by the tractor, required to operate and store the attached power rakes. The apparatus allows the user to rake and bale hay in a one pass operation. The apparatus further provides a mechanical "power take off" extension shaft between the hay baler and its tractor. The apparatus allows the power rakes to be independent of the tractor which means that the tractor may be used for other tasks immediately after disconnecting from the baler/extension frame.

24 Claims, 5 Drawing Sheets

RETROFITABLE WIDE WINDROW APPARATUS

TECHNICAL FIELD OF THE INVENTION

This invention relates to farming or agricultural implements and equipment; and in particular to a combined apparatus, that may be retrofitted to a standard baler, for raking cut hay into windrows for collection and baling in a single operation.

1. Background of the Invention

A common problem with hay baling operations is found in the number of passes that the procedure requires over the hay field. The hay must first be cut and allowed to dry in the field. The next pass requires that the cut and scattered hay be raked into a series of continuous piles commonly called "windrows." After the hay is placed in windrows, a hay baler is passed over the windrows to either bale the hay as bound rectangular bales or roll the cut hay into the so-called "round bale." A number of users have combined the raking and baling step into one pass with the associated savings in time, labor, and cost of fuel. This invention combines the raking and baling steps into one operation as does several previous disclosures; however, the actual raking apparatus is designed to be used with existing hay balers and tractors with minimal modification to the baler and no modification to the tractor.

2. Prior Art

The prior art for combination raker/balers breaks down into two distinct approaches: one, attachment of the power rake to the baler and, two, attachment of the power rake to the prime mover or tractor. The prior art will be discussed in the order given above.

The prior art which attaches the power rake to the baler requires that the rake and baler be manufactured as a complete unit. Thus, if a user wants to use a combination raking and hay baling apparatus that is attached to the baler, then that user must purchase a new combination baler/raker. U.S. Pat. No. 2,731,782 (Mason), issued in 1948, discloses a power rake attached to the baler and driven by the baler wheels. As the baler is pulled forward by a tractor, the support wheels turn and in turn drive both the rakes and the baler. This device does not work well because the baler tires have a tendency to slip over dry hay reducing the "power" that is available to the baler and the rakes. The problem has been solved in the marketplace by using direct mechanical power take off and hydraulic power from the prime mover; however, manufacturers had chosen only to power the baler and did not offer combined baler/rakes.

Recently U.S. Pat. No. 5,127,217 (Fell et al.), issued in 1992, attempts to resolve Mason by adding power rakes to a baler which are powered by the tractor. Fell has two minor drawbacks: one, the power rake is permanently attached to the baler at time of manufacture and, two, the power rakes only extend up to the axle width of the baler. The potential user must purchase a new baler and cannot retroactively fit the windrow rakes to an existing machine.

The retrofitable prior art attaches the power rake(s) to the tractor and two approaches have been taken. U.S. Pat. No. 4,077,189 (Hering) discloses a pair of hydraulically powered windrow rakes mounted on either side of the tractor, between the front and rear wheels. The power rakes gather cut hay from either side and in front of the tractor front wheels and windrow the hay so that it passes under the tractor, between the rear wheels, and into the intake of the baler which is pulled and powered by the tractor.

An interesting variation of this concept may be found in U.S. Pat. No. 4,214,428 (Caraway). Caraway uses readily available windrow rakes and attaches them to either side of a standard front end loader mechanism, which in turn, is attached to the tractor. Front end loader mechanisms can be purchased as an option for a tractor at any time. The Caraway windrow rakes operate in a manner similar to Hering.

Both Hering and Caraway have devised a retrofitable windrow rake device to operate in conjunction with a hay baler. Both disclosures have a similar disadvantage in that the rakes must be attached to the tractor and generally left in place during haying operations. It is well known that tractors have many uses on the farm and leaving a set of windrow rakes in place on the tractor for extended periods of time reduces the usefulness of the tractor.

Thus the prior art in combined raker/balers leaves two disadvantages:

1) if attached to the baler, there is no retrofitable rake, and
2) if retrofitable, then the rake must be attached to and left on the tractor, thus, reducing the usefulness of the tractor.

SUMMARY OF THE INVENTION

The inventor has recognized the limitations of the prior art and has devised a windrow raking system that can be retrofitted to an existing tractor driven hay baler with no modifications to the tractor and minimal modifications to the baler. The present invention provides an apparatus that combines the raking and baling operation, thus, achieving savings in fuel, labor and time. The apparatus of the present invention generally consists of a tongue attachment that is placed between the baler and the tractor (prime mover) taking the place of the existing trailer tongue of the baler which is used to support hay rakes. The tongue attachment takes the form of an extension frame with internal support members and associated cross members. The system may contain a power train extension shaft so that the PTO (Power Take Off) of the prime mover can still be coupled to the baler as well as necessary hydraulic lines to extend hydraulic power to the baler and provide power through a combination controller/diverter-valve to the rakes or to a lift cylinder. The necessary electric power/signal lines are also extended, through the apparatus, between the tractor and the baler. The present apparatus is designed to be permanently mounted to the baler in place of the original towing tongue, although the extension frame can be designed to be releasably attached to the baler.

The instant invention is an extension tongue or frame that supports an extension power shaft, hydraulic lines, and power rakes. The extension frame has sufficient strength to tow the attached baler, support the attached hay rakes and ancillary equipment associated with the rakes. The power rakes are hinged to the extension frame next to the baler and extend outward and forward past the rear wheels of the tractor so that hay can be windrowed and taken up into the intake chute of the baler. The length of the frame is chosen so that the power rakes can be stored within the confines of the frame. When the rakes are out of service, for transporting the baler from one place to another, they are stored on a lift frame which is attached to the extension frame. The lift frame has a pair of chains that hook onto the distal end of each rake. The lift frame is raised and lowered by a lift cylinder which uses hydraulic power from the tractor and whose controller is located on the extension frame.

Once the apparatus has been permanently retrofitted to an existing baler use of the apparatus is straightforward. To use the system, the tractor is attached to the extension frame via a standard hitch. The tractor PTO is coupled to the power extension shaft and hydraulic power lines and electric service lines are attached to the proper ports on the tractor. The only extra hydraulic lines, over those normally found with a hay baler, are the extra pair of hydraulic lines that operate the power rakes or lift cylinder. These extra lines cause no problem as most tractors have several available hydraulic power take off ports. The power rakes are lowered by releasing the pressure within the lift cylinder and the support chains are removed. The rakes are then extended outward and held in place by a pair of adjustable booms. The rakes are adjusted to required height for collection of the cut hay. At this point, the complete baler/raker is ready to be towed over the field to collect and bale hay.

Operating techniques for the combination baler/raker differ slightly from those presently used in two pass operations but are easy to comprehend. The tractor hydraulic and PTO controls operate the internals of the baler and a separate control operates the power rakes. (It should be noted that this separate tractor hydraulic control also operates the lift cylinder via a control/valve mounted on the extension frame—the controller/valve should be set to "rakes" prior to using the baler/raker.) The operator then proceeds to bale hay making necessary adjustments to the hydraulic controls and PTO from on the prime mover. At the end of the operation, the rakes would be brought to the center and attached to the lift frame via the support chains; the controller/valve would be switched to "lift" and the lift cylinder activated to raise the ends of the rakes from the field. The baler is now in a condition to be moved to another field or to be disengaged from the prime mover, thus, totally freeing the prime mover for other work.

DESCRIPTION OF THE PREFERRED EMBODIMENT

Attention is directed to FIGS. 1 through 4 of the drawings which illustrate the preferred mechanical aspects of the apparatus. The apparatus consists of a frame (shown in FIGS. 2 and 3), the windrow rakes (shown in FIG. 1) and various hydraulic and electric control lines linking devices on the frame to the tractor and devices on the baler to the tractor (shown in FIG. 4). Since the "base" of the invention is the frame, this portion of the apparatus will be described first. It is also anticipated that the "base" or extension frame will be manufactured and generally sold without windrow rakes. This is because most farmers will have hay rakes that can be attached to the extension frame and they will want to use existing equipment. On the other hand, a manufacturer can sell a complete system.

Figure 2:
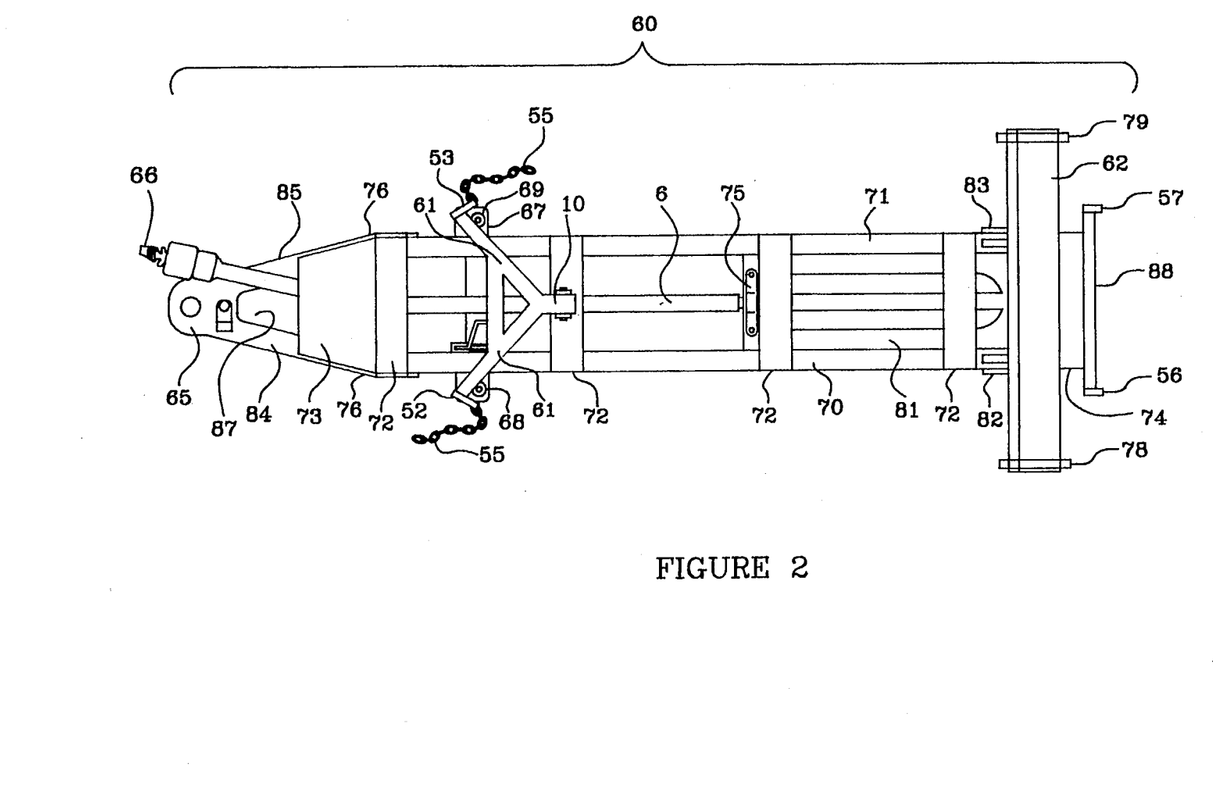
FIG. 2 is a simplified plan view of the instant invention omitting all hydraulic lines and controls and electrical lines.
Figure 3:
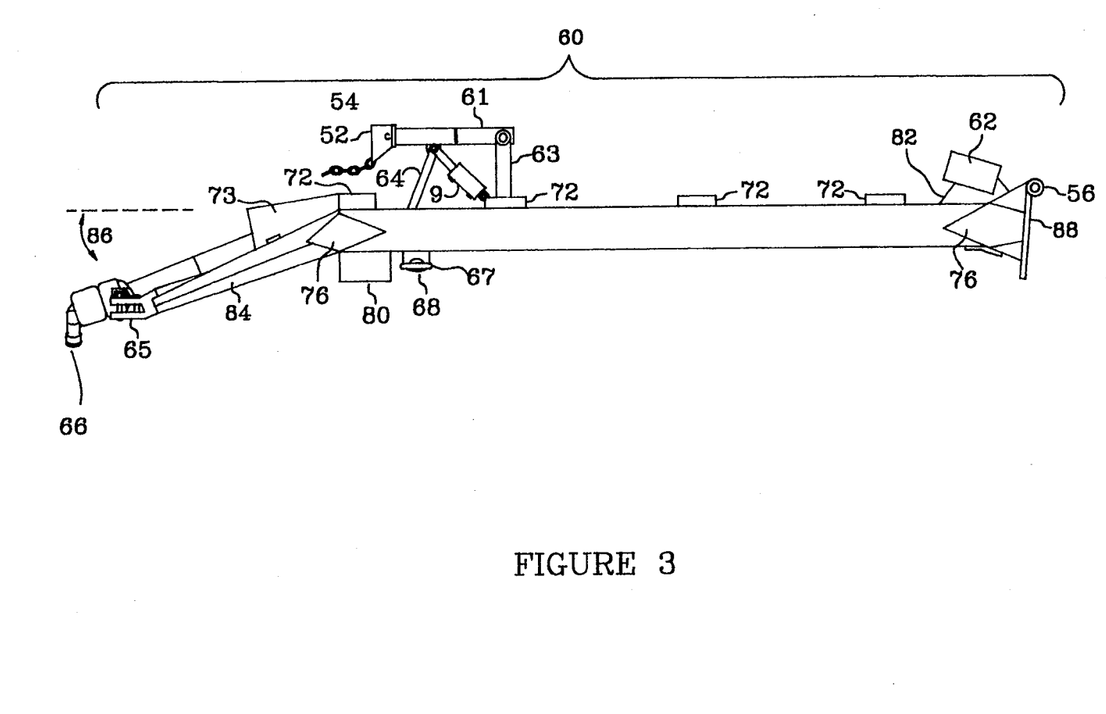
FIG. 3 is an elevational view of the instant invention shown in FIG. 2.

The extension frame, shown generally as item 60 in FIGS. 2 and 3, includes two main support members preferably in the form of U-channels, 70 and 71, which form the left and right frame support. These two channels are separated by a reasonable distance, to allow the Power Take Off extension, 6, to pass between them and to provide sufficient space on top of the extension frame to mount other ancillary equipment. The actual spacing is not critical, but a distance between 1 and 3 feet would be ample. The left and right frame support U-channels, 70 and 71, are joined by top cross braces, 72, top rear toe plate, 74, bottom rear toe plate, 81, and bottom front cross brace, 80. The two side frames are attached to left and right hitch arms, 84 and 85, which are connected to the side frames at an acute angle to the horizontal so that the hitch arms are directed downward. The hitch arms are joined together at their distal ends and terminate in the tractor attachment hitch, 65. The two hitch arms generally form the frame tongue, 87, which is at an acute angle, 86, to the horizontal. This angle, 86, is chosen so that when the extension frame, 60, is attached to the baler and hitched to the tractor, then the frame should be nearly horizontal to the ground. A front toe plate, 73, is joined between the two hitch arms and the front upper cross brace. Additional strength is provided by gussets, 76, located at the front and rear of the two frame sides. The extension frame is attached to the baler via left and right frame/baler attachment points, 56 and 57 which are mounted to the rear upper toe plate, 74. Alternately, the extension frame may be welded to the baler. These mounting techniques will be discussed in further detail.

A rake support bar, 62, is mounted over the rear toe plate, 74. The rake support bar is attached to the left and right frame sides, 70 and 71, by the left and right rake bar support brackets, 82 and 83, respectively. The left and right rake support brackets, 78 and 79, may be found at the respective ends of the rake support bar. These brackets are used to attach the windrow rakes, which will be discussed later.

A Power Take Off (PTO) extension shaft, 6, is routed from the front of the frame tongue, 87, to the rear of the frame. The extension shaft, 6, is equipped with a PTO insert, 66, for insertion into the PTO point on the tractor, a front universal joint, 4, and rear universal joint, 3. The rear universal joint can be the universal joint belonging to the baler; a method of attachment of the extension PTO shaft to the baler and a method to accommodate a difference in elevation is required. The front universal joint, 4, accommodates elevation changes between the tractor and the extension shaft. The extension shaft is supported within the extension frame by shaft supports, 75. It is best, although not absolutely necessary, to provide shaft support at the mid point and the two ends of the extension shaft. The shaft supports can be attached to the appropriate cross braces, front toe plate, or rear toe plate.

Located near the front of the extension frame, but slightly back of the frame tongue, is the lift mechanism, generally item 10, for the windrow rakes. The actual position will be determined by the length of the windrow rakes chosen to be used with the apparatus, for the lift mechanism should raise the outer (distal) ends of the windrow rakes. The lift mechanism is used to raise the rakes from the ground to facilitate transportation of the baler/raker.

The lift mechanism, 10, includes a number of component parts which are attached to a conveniently located cross brace, 72. A lift arm support bracket, 63, is attached to the cross brace. A lift arm, 61, is pivoted about the top of the lift arm support bracket. The preferred form of the lift arm is structured as a "Y" with a cross arm (un-numbered) between the arms of the "Y". The tail of the "Y" is pivoted about the support bracket and the arms of the "Y" are terminated in the left and right lift support plates, 52 and 53, respectively. The two support plates have a left and right lift support chain, 54 and 55, respectively. These chains can be wrapped about or attached to the distal ends of the power rakes and hook back onto the support plate. These chains actually carry the load of the rake whenever the rakes are lifted from the ground. The lift arm is powered by a hydraulic lift cylinder, 9, which pivots between the cross brace of the lift arm and the base of the lift support bracket. A safety bar, 64, falls into position whenever the rakes are in the raised position to prevent inadvertent lowering of the rakes.

Immediately below the tips of the lift arm "Y" and located on an extension line between those tips is the rake resting bar, 67. This bar is attached to the lower section of the extension frame and supports left and right rake mounts, 69 and 70, respectively. The resting bar and its associated rake mounts support the windrow rakes whenever the rakes are stored. The actual operation of the apparatus for raising, lowering, or storing the windrow rakes will be discussed later.

Figure 1:
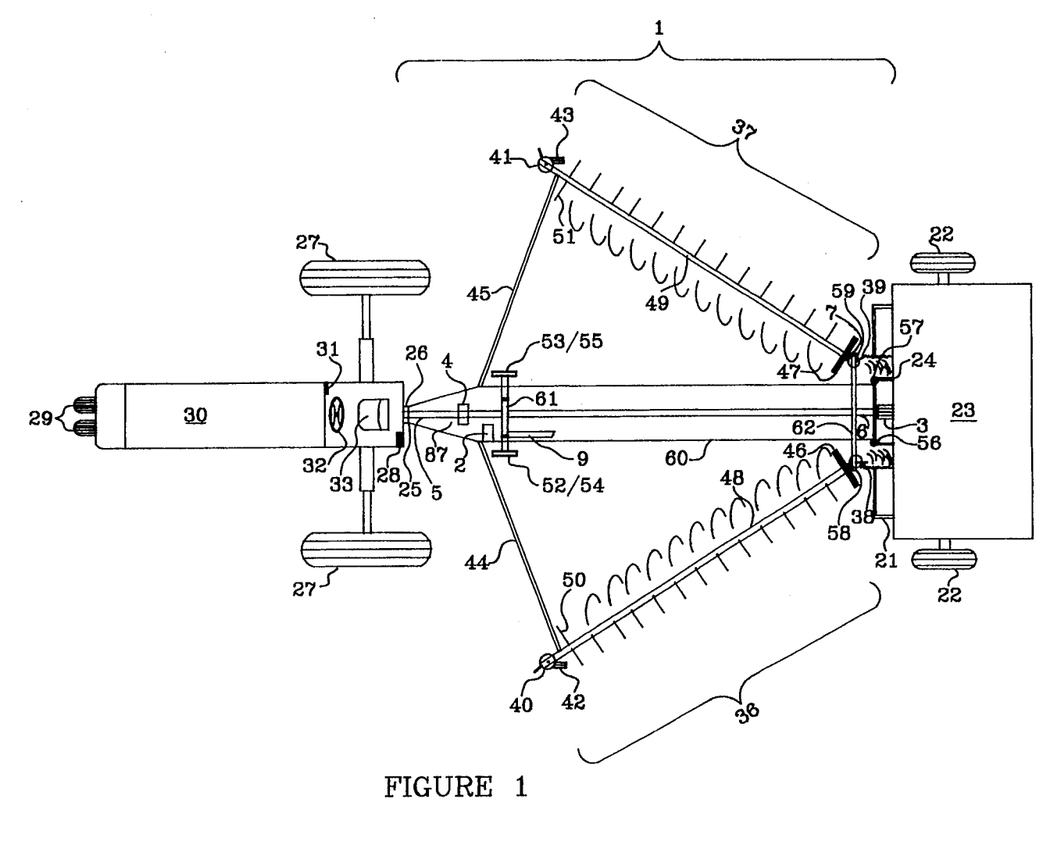
FIG. 1 is a plan view of the combination of hay baler, the instant invention, and the prime mover (tractor). The instant invention is shown between the baler and the tractor.

Refer now to FIG. 1, which is a top plan view of the apparatus installed on a baler and pulled by a tractor. The windrow rakes, shown generally as items 36 (left rake) and 37 (right rake) are standard conventional units. The rakes are pivotally attached to the rake support bar, 62, by their respective left and right support brackets, 78 and 79. The left and right rakes are driven by their respective hydraulic motors, 7 and 8, which are powered by the tractor hydraulic system. The hydraulic systems will be discussed later. Each windrow rake will be supplied with various items depending on the manufacturer of the unit. In general a rake will be supplied with driven disks, 46 and 47, driven tines, 48 and 49, and front disks, 50 and 51. Each rake will have a manual adjustment, which regulates the height of the tines above the ground, located at the respective front, 40 and 41, and rear, 38 and 39 of the rakes. The front of the rake rests on a wheels, 42 and 43, respectively each of which is coupled to its respective height regulator. The rear height regulators actually couple to the left or right rear support brackets, 78 or 79. FIG. 1 shows the distal ends of the power rakes extending beyond the width the tractor behind the rear wheels, 27; thus, creating the windrow swath.

Figure 1A:
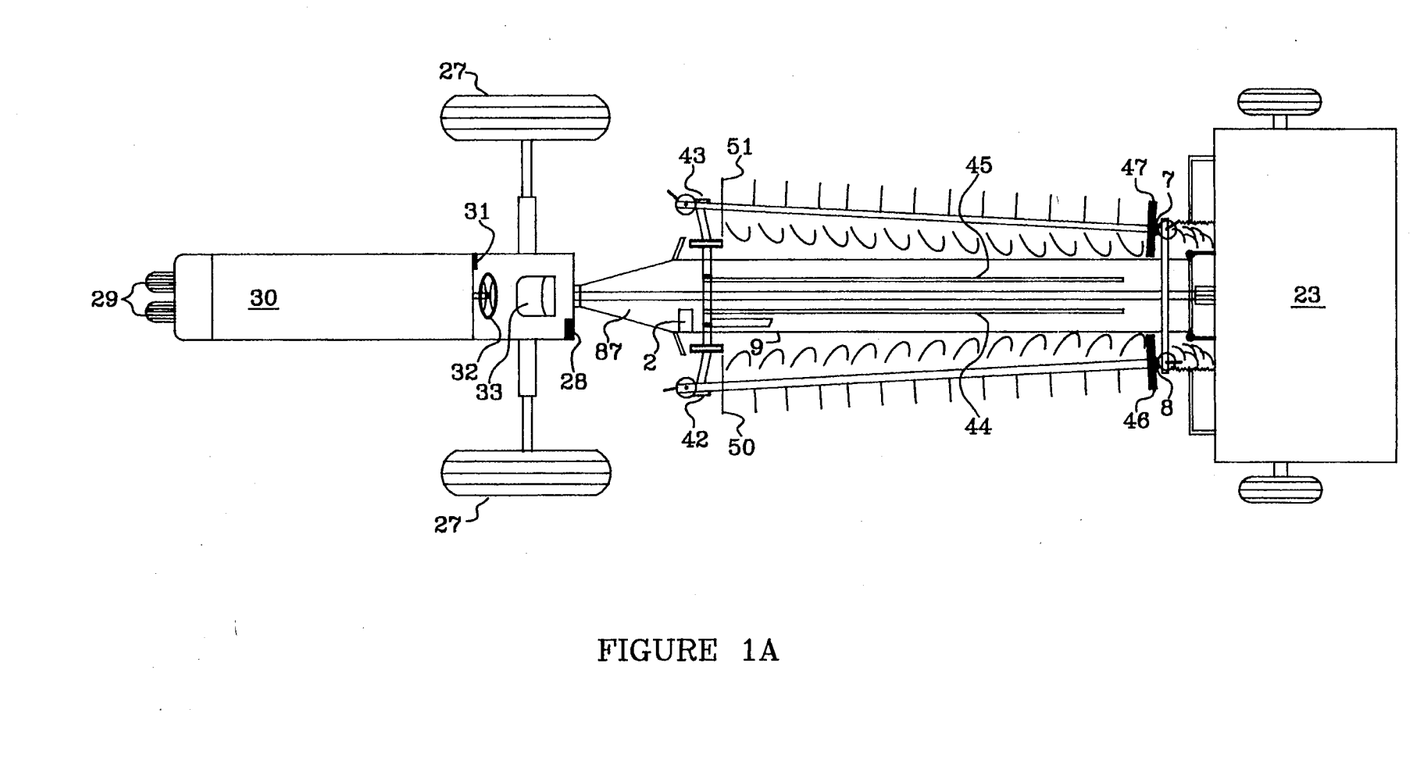
FIG. 1A is a plan view of the instant invention showing the rakes stored on the extension frame in preparation for transportation to another location.

The two rakes are kept in their operating position by adjustable booms, 44 and 45. The booms fit into openings in the front toe plate (not shown) and onto hooks on the rakes (not shown). These booms regulate the width of the path swept by the rakes as they gather mown hay into the baler. The booms and associated power rakes are standard farm implement components and may vary in their specific designs. The preferred method of attachment of the rakes to the frame of the instant invention has already been described. As explained previously, when the rakes are not in operation, the rakes are supported at the front of the extension frame by the lift mechanism. It should be noted that the spread of the lift arms of the lift mechanism must be chosen to provide sufficient clearance between the front disks and the extension frame to avoid damage to the disks. FIG. 1A shows the rakes in their transportation position and illustrates how the booms, 45 and 46, are stored within the extension frame.

Figure 4:
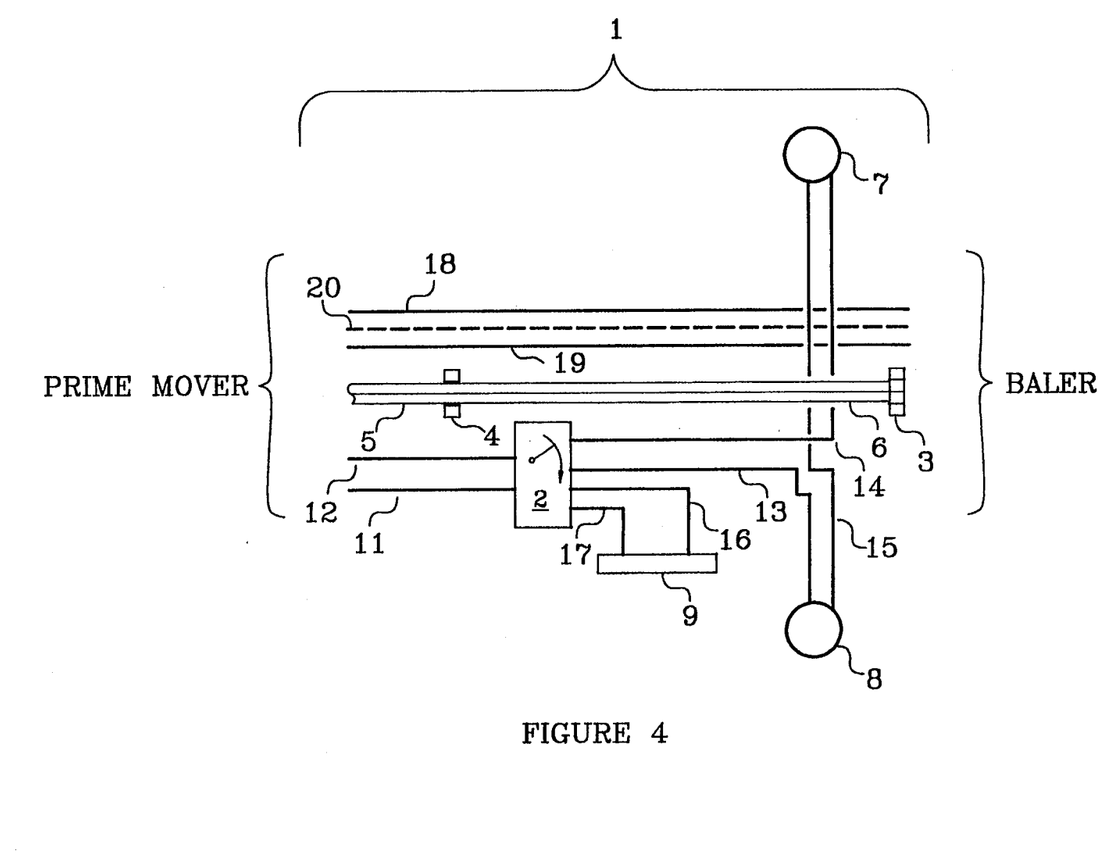
FIG. 4 is an electro-mechanical schematic showing mechanical hydraulic and electrical power transmission and control associated with the instant invention.

FIG. 4, which is an electro-mechanical schematic of the instant invention, illustrates the power transfer, electric and hydraulic controls for the preferred embodiment of the invention. Rotary mechanical power is supplied to the baler by an extension PTO shaft, 6. As explained previously, the shaft is supported within the extension by proper mounts. The extension shaft, 6, has two universal joints, 4 and 3. If necessary, additional universal joints can be employed to accommodate variations in height or offset. The extension shaft functions to extend the PTO connection between the tractor and the baler through the extension frame and into the tractor. All items used in the shaft should be standard and this is preferred for economy and ease of construction.

Two extension hydraulic lines, 18 and 19, run from the baler to a hydraulic power take off point on the tractor. These two lines serve to extend the existing hydraulic power lines found on a baler. The two extension lines would not be required if the instant invention is being attached to a baler that does not utilize hydraulic power. Also shown in FIG. 4 are the electrical control lines, 20, which are extended from the baler to the tractor. These electric control lines provide power to and/or control of electrical components found on the baler. As previously emphasized, these standard input connections (mechanical rotary power, mechanical hydraulic power or controls, electrical power and controls, etc.) for the baler are extended over the extension frame to the tractor.

The extension frame includes additional hydraulics that are usually not associated with a baler. These hydraulics are required to operate the hydraulic motors (7 and 8) found on the power rakes and the hydraulic lift cylinder, 9, associated with the lift mechanism used for raising the rakes from the ground. Hydraulic power from the tractor is brought to these three devices by hydraulic lines, 11 and 12 to the hydraulic controller 2. The hydraulic controller serves two functions:

a) diverts hydraulic fluid between the hydraulic motors, 7 and 8, or the power cylinder, 9, and b) when diverting hydraulic fluid to the power cylinder, acts as a controller for the power cylinder so that the cylinder can be extended or retracted.

The hydraulic controller, 2, is preferably assembled from standard, readily available hydraulic parts, as well understood in the art; thus, any person skilled in the art of hydraulic systems can assemble such a combination unit. Hydraulic power from the controller is applied to the motors, 7 and 8 by lines 13, 14, and 15. The lines are tubed to the motors in such a manner that the motors are connected in "series". That is, pressured fluid passes from the controller to one of the motors, then via line 15 to the other motor, and then back to the controller. The direction of rotation of the hydraulic motors is controlled by the direction of the flow of hydraulic fluid. If the controller is operating the lift cylinder, then pressured fluid is passed to the cylinder via the hydraulic lines, 16 and 17, running between the cylinder and the controller.

As previously stated, the extension frame is attached to a standard baler in place of its tractor tongue. The method of attachment will be determined by the method by which the baler manufacturer attached the baler tongue to the baler. Generally these tongues are hinged near the input chute, 24, of the baler; thus, the user need only remove the retaining pins or bolts on the baler tongue and hinge or pin the extension frame in its place at points 56 and 57. However, the baler supports the weight of the extension frame, the power rakes, and other ancillary equipment mounted on the extension frame. For permanent attachment, it is preferred that the extension frame be welded to the baler, although pinning techniques may be used for temporary attachment. If pinning techniques are used, a load plate, 88, should be attached to the extension frame sides, top rear and bottom rear toe plates. This load plate, operating in conjunction with the attachment points, 56 and 57, will stop the extension frame frown pivoting about the baler.

The load plate, 88, can be used even if a decision is made to permanently weld (or attach) the extension frame to the baler. In fact this load plate is preferred to ensure a more secure connection between the baler and the extension frame. It should be noted that the load plate must have an opening (not shown) through which the extension shaft, 6, can pass.

Once the extension frame is attached to the baler, the extension power take off shaft, 6, should be installed along with the extension hydraulic lines, 18 and 19, and electrical lines, 20. These lines are omitted from the mechanical Figures for reasons of clarity, but one of reasonable skill in the art can readily connect such lines from the written disclosure and the illustration of FIG. 4. After the extension frame has been installed, the power rakes should be attached to their proper points on the support bar while allowing the rake leading edge wheels, 42 and 43, to rest on the ground.

The extension frame tongue may or may not tip onto the ground when the rakes are placed in the transport position. Whether the extension frame tongue tips to the ground will depend on the type of baler used, and its weight as well as the length and weight of the rakes employed on the apparatus. It is possible to optionally provide the extension frame apparatus with a standard tongue support mechanism such as tongue jack (either screw or telescoping), which may fold away or remain in place, to support and stabilize the tongue.

Use of the apparatus is relatively straightforward. Assuming that the instant invention has been properly mounted on a baler, that the rakes are in the "transportation" or stored position, that a tractor is not hitched to the baler, and that the user wishes to operate the equipment, a prime mover must first be connected. The user would select an appropriate tractor: one that has hydraulic and mechanical power take off points and is capable of supplying necessary electrical power/controls for the baler. The tractor would be hitched to the extension frame and the extension PTO shaft attached to the PTO point on the tractor. The hydraulic lines (if present) for the baler, 18 and 19, would be attached to an appropriate hydraulic power point. The rake/lift cylinder hydraulic lines, 11 and 12, would be attached to another hydraulic power point. Finally, the electrical power/control lines should be attached to their appropriate points oil the tractor.

If the front wheels, 42 and 43, of the rakes, have been in contact with the ground as a safety measure, then they should be raised. This is accomplished by tuning the two height regulators until the wheels clear the ground with sufficient allowance for rough terrain. The operator should check to make certain that the rakes are resting on their appropriate mounts (68 and 69 in FIG. 2) and that they are locked down via their respective lift support chain (54 and 55 in FIG. 2) before pulling onto a public highway on the way to the field to be harvested. There will be little or no difference in handling characteristics for the baler/extension frame combination 'on the road', except for the extra length involved. The operator will have to make adjustments when turning the combination device around corners. The turning characteristics will be similar to that of a large tractor-trailer rig.

Once the combination device is off from the public highway and if extra clearance is needed for the rakes, the lift cylinder can be raised to lift the leading wheel of the rakes higher above the ground: necessary hydraulic power is supplied from the tractor to the controller, 2, on the frame. The safety bar, 64, should be set in place. Now, assuming that the combination device is in the field to be harvested, the apparatus must be set for harvesting. The operator would use the hydraulic controller, 2, the lift cylinder, 9, and the lift mechanism, 10, to lower the leading wheels of the rakes onto the ground. The operator would disengage the two lift support chains, 54 and 55, and pull the leading end of the two rakes out away from the extension frame. The support chains should be wrapped about the support plates so that they are out of the way. The operator would then place the two booms, 44 and 45, in their proper slots and adjust their length so that the windrow swath is to the liking of the operator. Finally the operator should make certain that the diverter valve associated with the hydraulic controller, 2, is set to send hydraulic fluid to the rake motors rather then to the lift cylinder.

The operator is now ready to simultaneously rake and bale hay. The power rakes, 36 and 37, will rake the cut hay into a continuous windrow which will feed into the intake chute, 24, of the baler, 23. Operation of the combination device is similar to operation of a baler. The operator should carefully track around the field, making certain that the extended power rakes do not come in contact with improper objects in the field. Each pass should slightly overlap the previous pass in order to assure collection of the cut hay. All controls for the baler and the power rakes are located on the tractor, 31. The operator would adjust the baler controls as per the baler's instruction manual. The power rakes would be set as per their instruction manual. The speed of the rakes can be adjusted by adjusting the hydraulic controls for that particular hydraulic power take off point from the tractor control panel, 31.

Once the field is complete, the rakes should be returned to their "transportation" or storage position. The operator would remove the two booms, 44 and 45, and store them within the extension frame. The distal end (leading end) of each rake would be wheeled up the frame and the lift support chains, 54 and 55, attached to the rakes. The lift mechanism would be activated through the use of the hydraulic diverter valve and controller, 2, and the rakes lifted up into their transportation position. The safety bar, 64, would be set in place.

The height adjustment on the wheels can be left as is or, if necessary, the wheels could be raised to obtain more clearance flora the ground. The unit can now be moved to another field.

If the unit is to be left without the tractor attached, then it should be parked out of the way. The power rakes should be lowered so that they rest on the rest mounts, 68 and 69, located on the resting bar, 67. The tongue jack should be lowered to support the weight of the tongue and if necessary, as an additional safety measure, the rake leading wheels can be lowered so that they rest on the ground as additional support. The tractor can now be disconnected from the combination device and the tractor is free of any encumbrances. This means that the operator can immediately use the tractor for other chores without concern about unneeded equipment still attached to the tractor. It should also be noted that the rakes and baler are stored together and available for almost instant use at any time.

There are a number of minor changes that may be made to preferred embodiment thus far described. For example, the extension frame does not necessarily have to be capable of supporting the hay rake structures during transportation as the leading end of those rakes could easily be hung from the tractor. Thus, the extension frame could be made shorter than the preferred embodiment. In fact, it may not be necessary to provide a transportation mode for the hay rakes; this would be particularly true if the apparatus was to be left in a large field and never removed from the same. Further, it be would easy to provide a hydraulic actuator within the booms, 44 and 45, that would allow the operator to remotely adjust the rake angle by varying the length of the booms. The hydraulic controls for this particular device could be mounted on the tractor or could be mounted on the extension frame, within reach of the operator. If the control was mounted on the extension frame the device would operate in a similar manner as the hydraulic controller, 2, already described, for the lift mechanism, 10, and rake motors, 7 and 8. Finally, the booms need not be adjustable in length as the user could easily fashion several fixed length booms and utilize the length that is required for a particular set of baling circumstances.

Thus, this invention resolves the major problems left by the prior art. The invention significantly speeds up baling time by reducing setup and setdown time. It eliminates a step and, most importantly, it leaves the tractor free of any unnecessary ancillary equipment.

The foregoing description should be construed as illustrative only of the principles of the invention. Numerous changes and modifications will easily come to the mind of those skilled in the art and it is not desired to limit the invention to the exact construction and methods shown and described. Accordingly, all suitable modifications and equivalents to the instant invention may be resorted to and should be construed as falling within the scope of the instant invention.

I claim:

1. A retrofitable windrow apparatus for attachment to a towed baler mounted behind a tractor for baling and providing means for mounting the baler for towed movement by the tractor, the apparatus comprising:

an extension frame, to extend between the tractor and the baler, having sides, a front end and a rear end, attached to the baler at said rear end of said extension frame, said extension frame adapted for attachment of hay rake means;

means for attaching said front end of said extension frame to the tractor;

means for attaching said rear end of said extension frame to the baler.

2. The retrofitable windrow apparatus of claim 1 further comprising adjustable hay rake means mounted to said extension frame for raking hay toward said extension frame for pick up by the baler and further comprising means for powering said hay rake means.

3. The retrofitable windrow apparatus of claim 2 wherein said adjustable hay rake means comprises a horizontally extending hay rake structure with first and second ends pivotally attached at said first end of said hay rake structure to said extension frame near said rear end thereof.

4. The retrofitable windrow apparatus of claim 2 wherein said adjustable hay rake means comprises a plurality of materially similar horizontally extending hay rake structures each with first and second ends and each pivotally attached at said first end of said hay rake structure to said extension frame near said rear end thereof.

5. The retrofitable windrow apparatus of claim 3 further comprising adjustable length boom means, having a first end and a second end, for adjusting the distance of extension of said second end of said hay rake structure outwardly from said extension frame.

6. The retrofitable windrow apparatus of claim 4 further comprising adjustable length boom means, having a first end and a second end, for adjusting the distance of extension of said second end of said hay rake structures outwardly from said extension frame.

7. The retrofitable windrow apparatus of claim 5 wherein said boom means includes a horizontally extending member having first and second ends coincident with said first and second ends of said means pivotally attached at said first end to said extension frame near front end thereof and pivotally attached at said second end to said rake structure.

8. The retrofitable windrow apparatus of claim 6 wherein said boom means includes a plurality of materially similar horizontally extending members each having first and second ends coincident with said first and second ends of said means each pivotally attached at said first end to said extension frame near front end thereof and pivotally attached at said second end to one of said rake structures.

9. The retrofitable windrow apparatus of claim 8 wherein said boom means further includes activating means for adjusting the distance of extension of said second end of said hay rake structures outwardly from said extension frame and control means for controlling the operation of said activating means.

10. The retrofitable windrow apparatus of claim 9 wherein said activation means is hydraulic.

11. The retrofitable windrow apparatus of claim 8 wherein said means for powering said hay rake means is a hydraulic motor.

12. The retrofitable windrow apparatus of claim 8 further comprising an extension power take off shaft running from said front end of said extension frame to said rear end of said extension frame whereby mechanical power can be transferred from the tractor to the baler.

13. The retrofitable windrow apparatus of claim 11 further comprising means for supporting said hay rake structures above the ground to facilitate transportation of the baler and said extension frame.

14. The retrofitable windrow apparatus of claim 13 wherein said means for supporting said hay rake structures is a lift mechanism comprising a lift arm, said lift arm pivotally connected to said extension frame near front end thereof, and a hydraulic cylinder connected between said lift arm and said extension frame whereby said hay rake structures may be attached to said lift arm and lifted and supported thereby.

15. The retrofitable windrow apparatus of claim 14 wherein the tractor has a source of hydraulic power and wherein the apparatus of claim 14 further comprises a hydraulic controller whereby hydraulic power from the tractor may be diverted to said hydraulic cylinder.

16. A retrofitable windrow apparatus for attachment to a towed baler mounted behind a tractor for baling and providing means for mounting the baler for towed movement by the tractor, the apparatus comprising:
- an extension frame, to extend between the tractor and the baler, having sides, a front end and a rear end, attached to the baler at said rear end of said extension frame;
- means for attaching said front end of said extension frame to the tractor;
- means for attaching said rear end of said extension frame to the baler; and,
- mounting means for attaching farm implement means.

17. The retrofitable windrow apparatus of claim 16 wherein said farm implement means comprises an adjustable hay rake structure mounted to said extension frame for raking hay toward said extension frame for pick up by the baler, said hay rake structure having first and second ends and extending horizontally from said extension frame, pivotally attached at said first end of said hay rake structure to said extension frame near said rear end thereof, and wherein the retrofitable windrow of claim 16 apparatus further comprises
- a horizontally extending member having a first end and a second end, pivotally attached at said first end to said extension frame near said front end thereof and pivotally attached at said second end to said rake structure, for adjusting the distance of extension of said second end of said hay rake structure outwardly from said extension frame; and,
- means for powering said hay rake structure.

18. The retrofitable windrow apparatus of claim 17 wherein said means for powering said hay rake structure is a hydraulic motor.

19. The retrofitable windrow apparatus of claim 18 further comprising an extension power take off shaft running from said front end of said extension frame to said rear end of said extension frame whereby mechanical power can be transferred from the tractor to the baler.

20. A retrofitable windrow apparatus for attachment to a towed baler mounted behind a tractor having a source of hydraulic power for baling and providing means for mounting the baler for towed movement by the tractor, the apparatus comprising:
- an extension frame, to extend between the tractor and the baler, having sides, a front end and a rear end, attached to the baler at said rear end of said extension frame;
- means for attaching said front end of said extension frame to the tractor;
- means for attaching said rear end of said extension frame to the baler;
- a plurality of adjustable hay rake structures each mounted to said extension frame for raking hay toward said extension frame for pick up by the baler, said hay rake structures each having first and second ends and extending horizontally from said extension frame, each pivotally attached at said first end of said hay rake structure to said extension frame near said rear end thereof;
- a plurality of materially similar horizontally extending members each having a first end and a second end, each pivotally attached at said first end to said extension frame near said front end thereof and each pivotally attached at said second end to each of said rake structures, for adjusting the distance of extension of said second ends of each of said hay rake structures outwardly from said extension frame; and
- means for powering said hay rake structure.

21. The retrofitable windrow apparatus of claim 20 further comprising a lift arm said lift arm pivotally connected to said extension frame near front end thereof and a hydraulic cylinder connected between said lift arm and said extension frame whereby said hay rake structures may be attached to said lift arm and lifted and supported thereby.

22. The retrofitable windrow apparatus of claim 20 wherein said means for powering said hay rake structure is a hydraulic motor.

23. The retrofitable windrow apparatus of claim 21 wherein the tractor has a source of hydraulic power and wherein the apparatus of claim 21 further comprises a hydraulic controller whereby hydraulic power from the tractor may be diverted to said hydraulic cylinder.

24. The retrofitable windrow apparatus of claim 20 further comprising a extension power take off shaft running from said front end of said extension frame to said rear end of said extension frame whereby mechanical power can be transferred from the tractor to the baler.

* * * * *